INVENTORS
CORNELIS VAN DER LELY
ARY VAN DER LELY

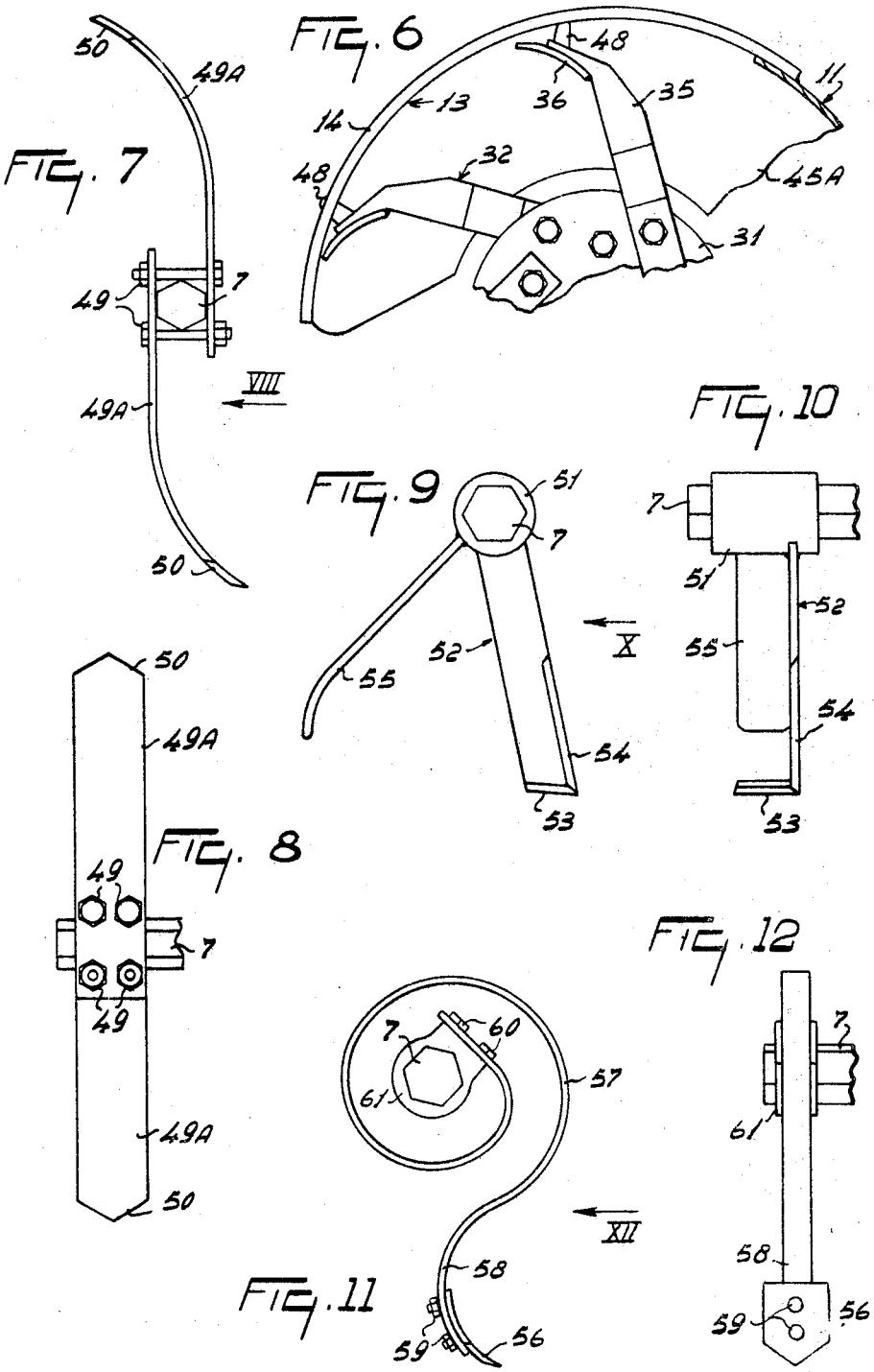

July 28, 1970     C. VAN DER LELY ET AL     3,521,712

SOIL CULTIVATING IMPLEMENT

Filed Feb. 23, 1966

INVENTORS
CORNELIS VAN DER LELY
ARY VAN DER LELY
BY
Mason, Mason & Albright
Attorneys

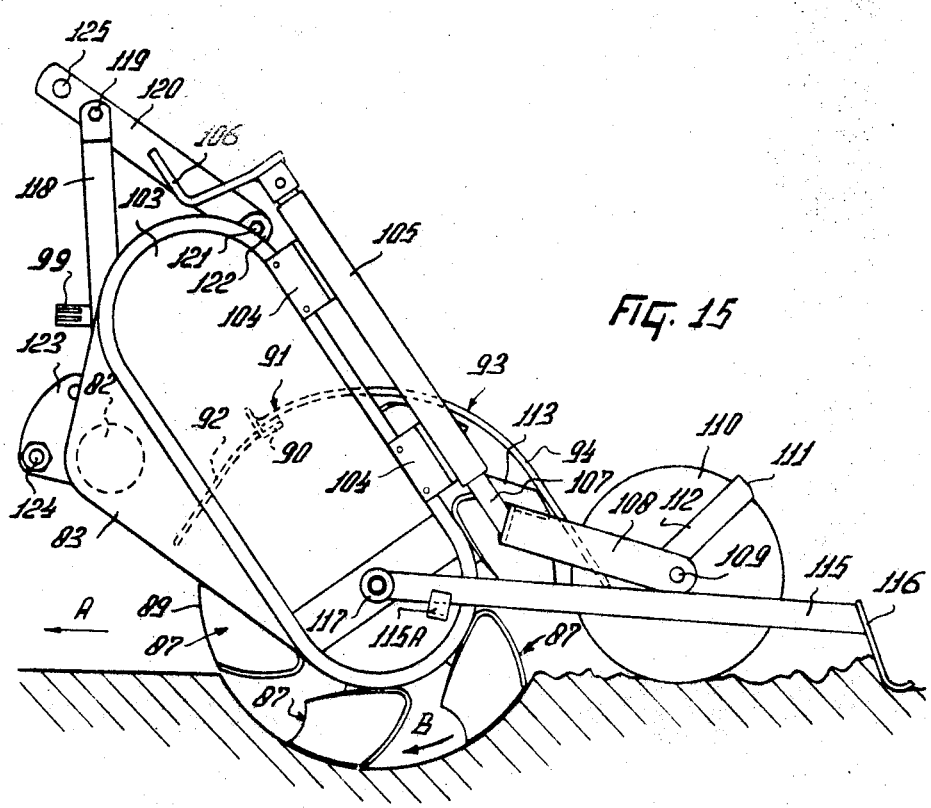
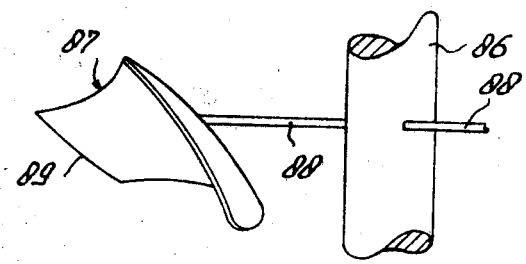

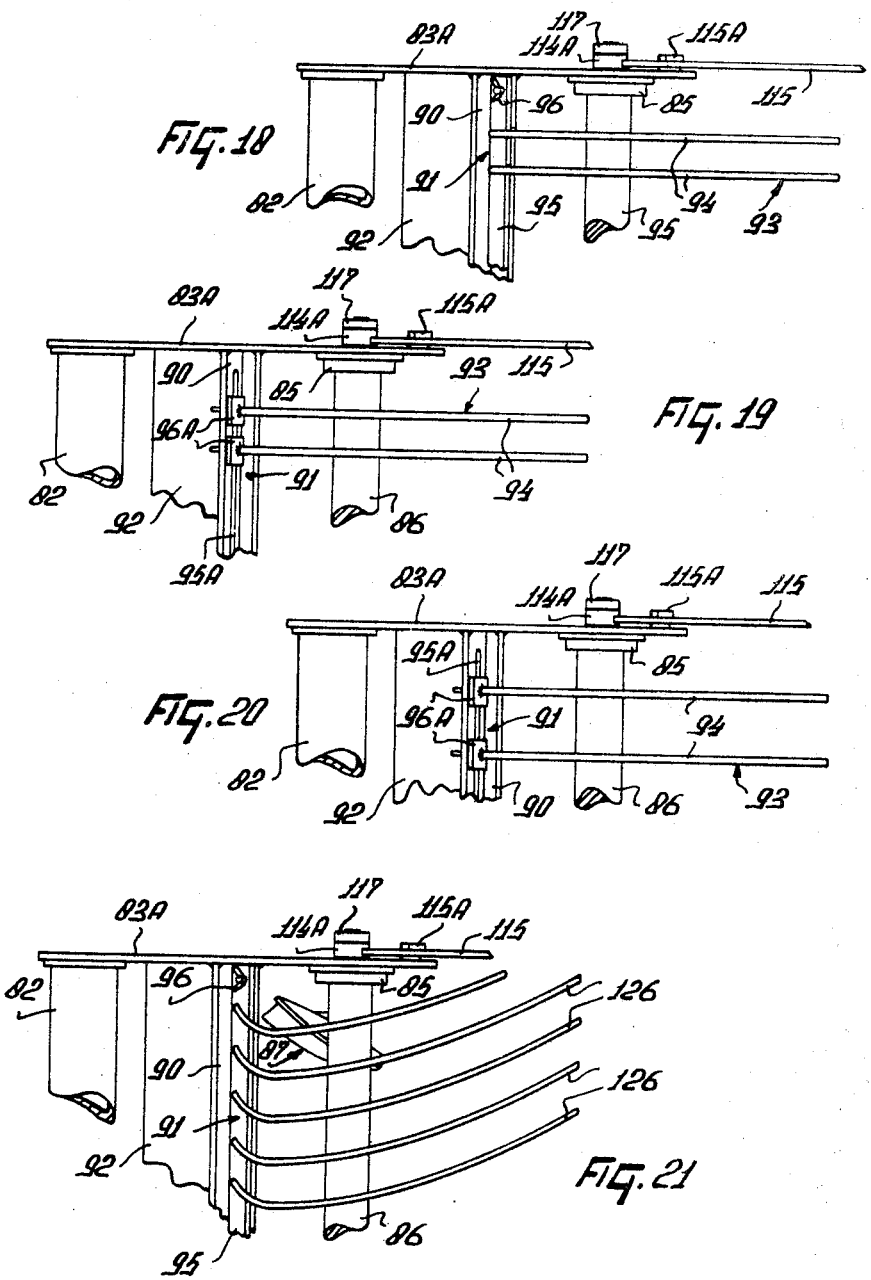

United States Patent Office 3,521,712
Patented July 28, 1970

3,521,712
SOIL CULTIVATING IMPLEMENT
Cornelis van der Lely, 7 Bruschenrain, Zug, Switzerland, and Ary van der Lely, 10 Weverskade, Maasland, Netherlands
Filed Feb. 23, 1966, Ser. No. 529,486
Claims priority, application Netherlands, Mar. 6, 1965, 6502899; June 28, 1965, 6508260
Int. Cl. A01b 33/02, 33/16
U.S. Cl. 172—112                                    16 Claims

ABSTRACT OF THE DISCLOSURE

A soil cultivating implement with a frame in which is mounted a rotatable shaft with soil working members. An apertured hood screens the soil dug up by the soil working members during operation so that the larger pieces of soil fall to the rear as the implement is traveled. A further hood can be mounted above the apertured hood.

---

This invention relates to a soil cultivating implement comprising a frame, at least one rotatably mounted shaft provided with a plurality of members for working the ground when the shaft rotates and a hood at least partly surrounding said shaft.

In accordance with the invention there is provided a soil cultivating implement comprising a frame, at least one rotatably mounted shaft provided with members for working the ground when the shaft rotates and a hood at least partly surrounding said shaft, wherein the hood comprises at least one apertured portion which is so arranged that, during a soil cultivating operation, the soil dug-up by the working members is thrown against said apertured portion so that parts of the dug soil can pass through the openings of said apertured portion of the hood and are thereby separated from other relatively larger and more solid parts of the dug soil which are unable to pass through said openings.

Figure 1:
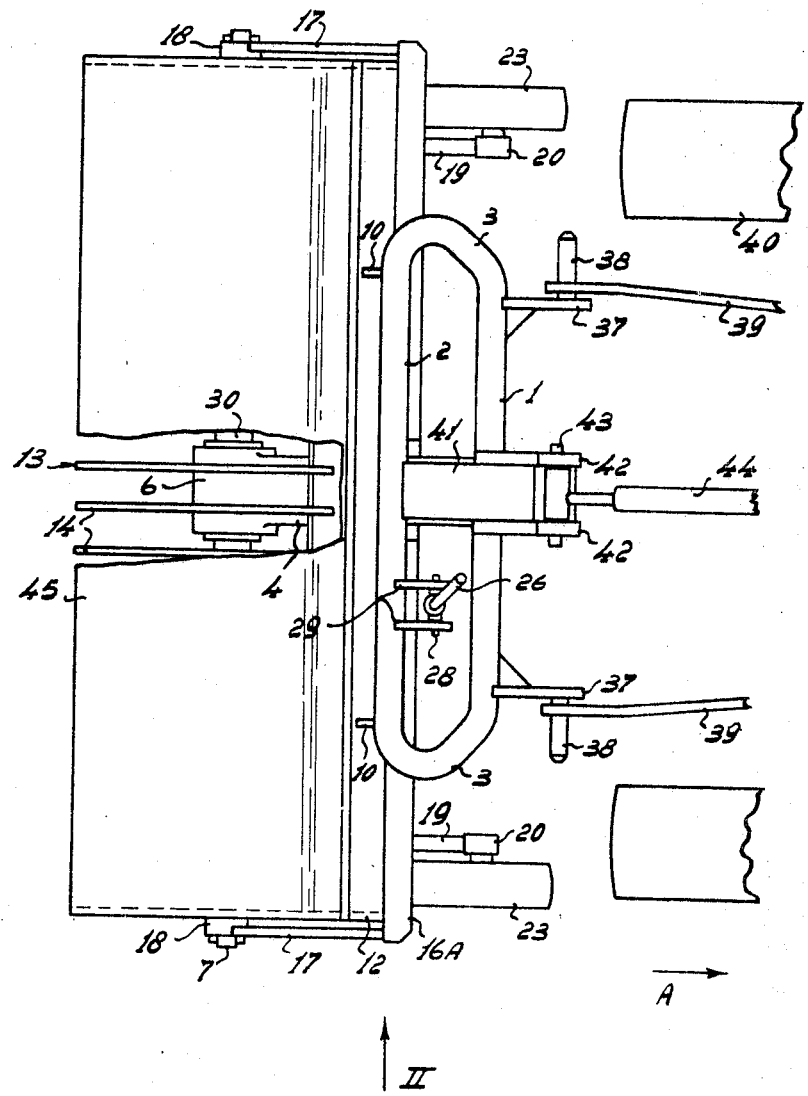
Figure 2:
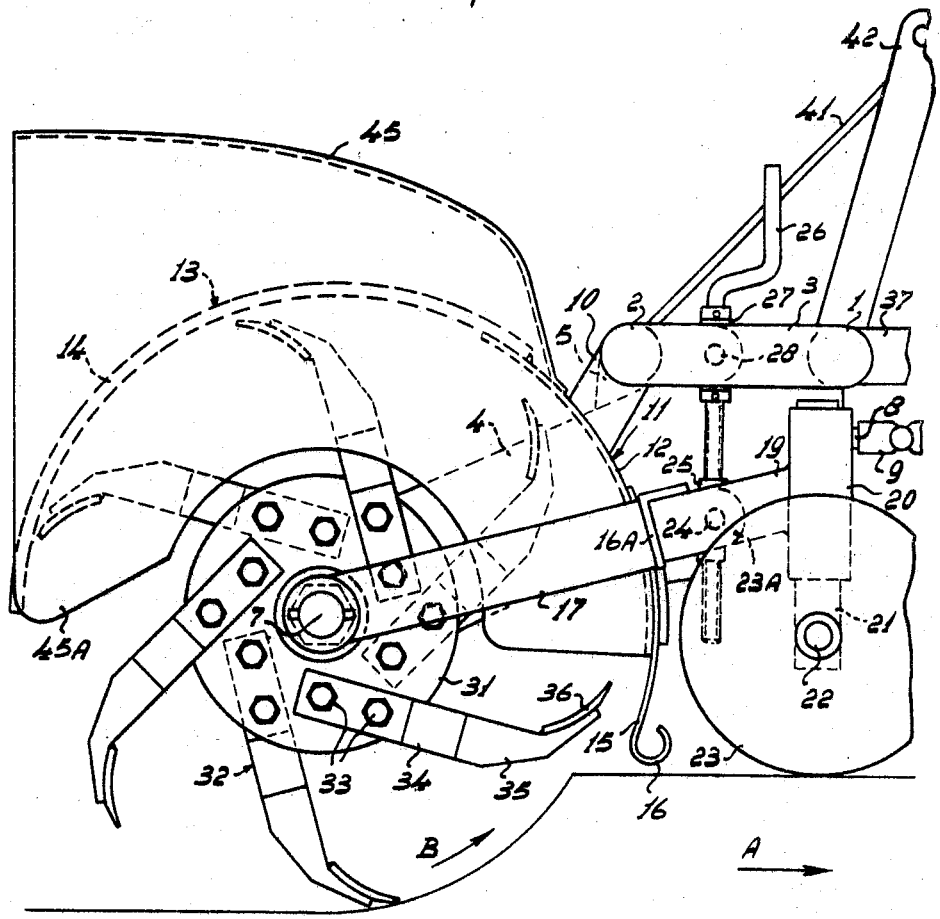
Figure 3:
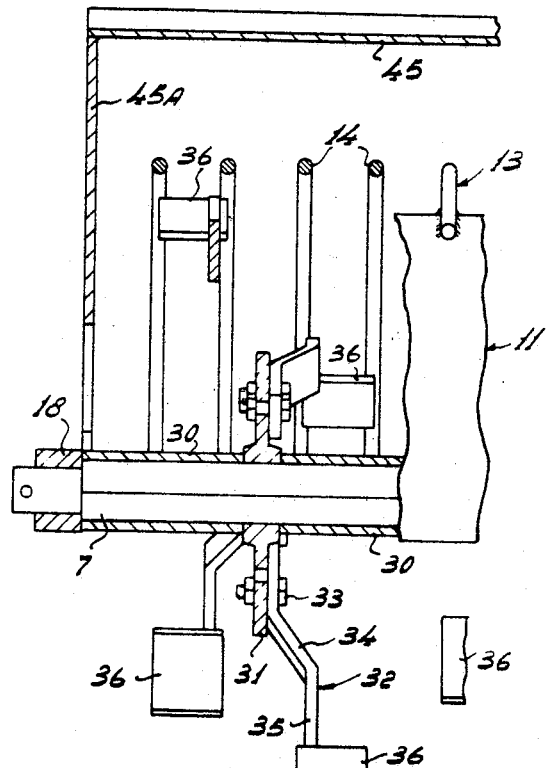
Figure 5:
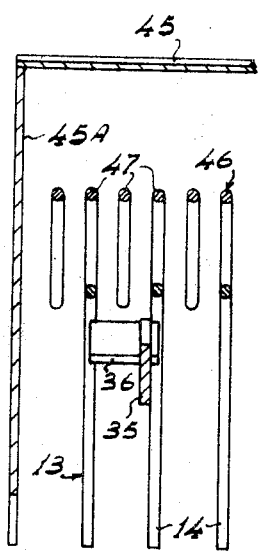
Figure 4:
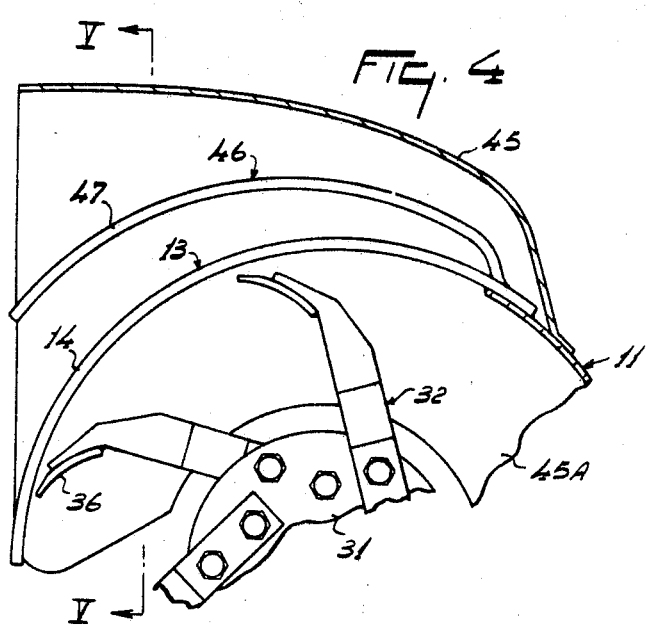
Figure 13:
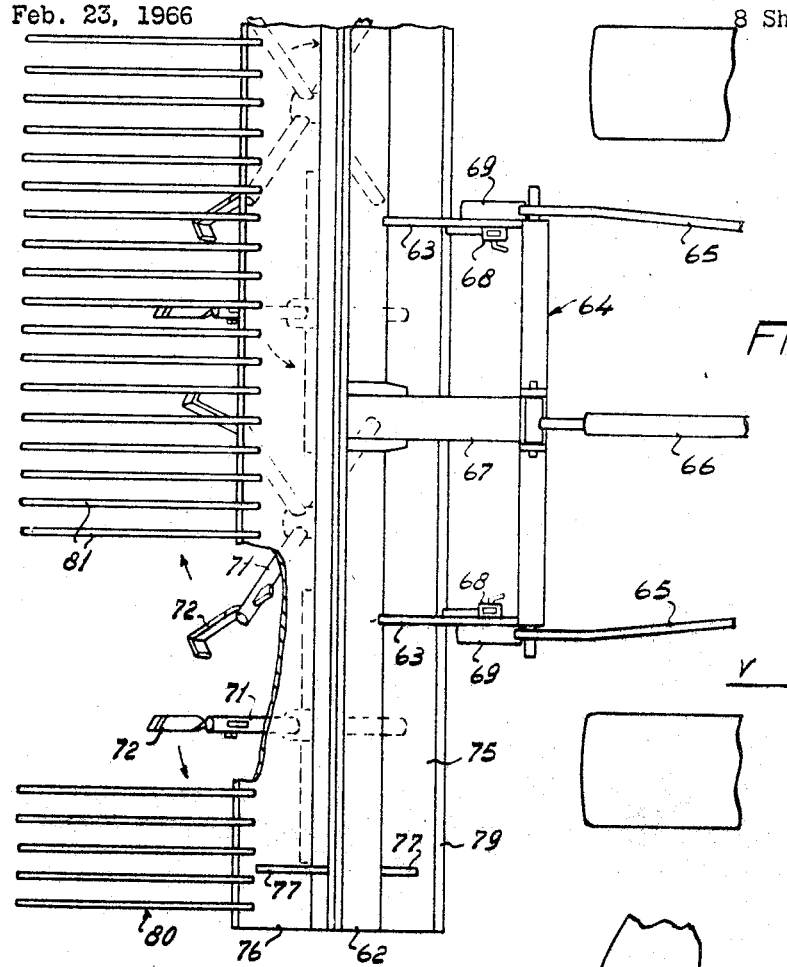
Figure 14:
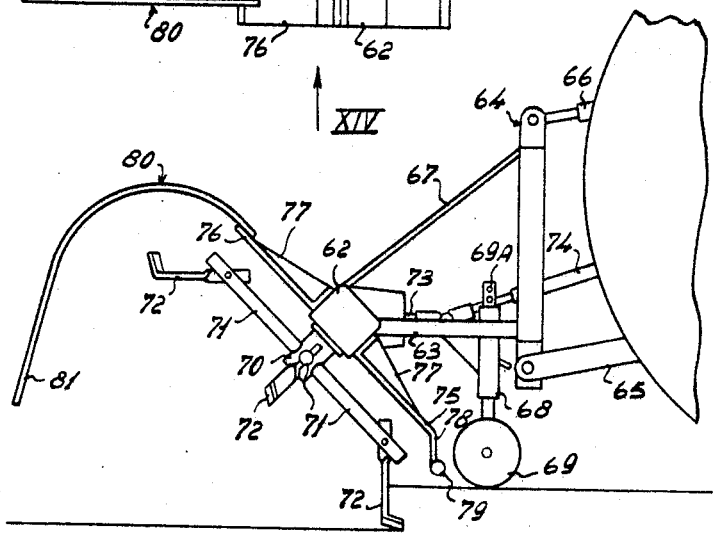
Figure 16:
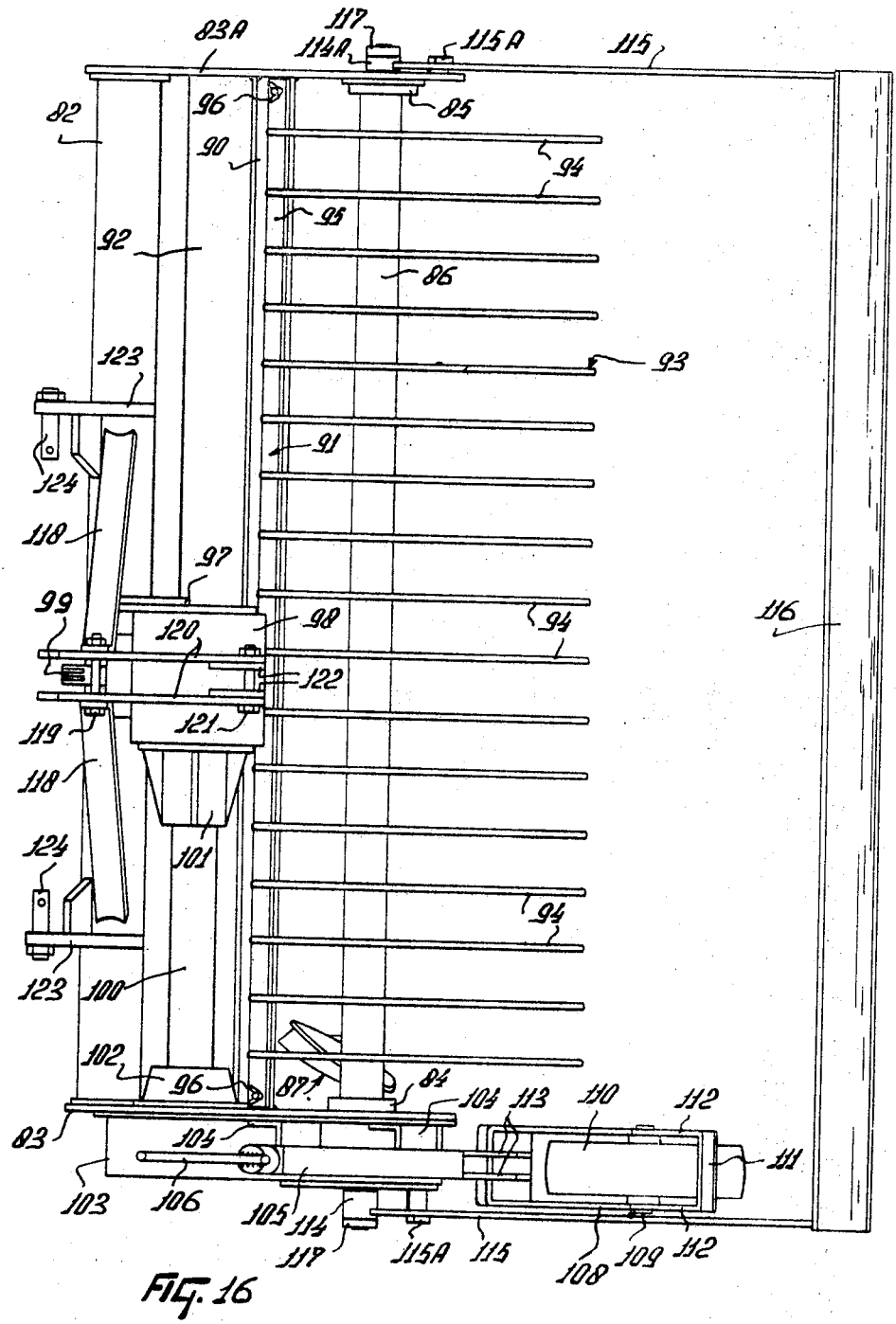

For a better understanding of the invention, and the method by which the same can be performed, reference will now be made, by way of example, to the accompanying drawings, in which:

FIG. 1 is a plan view of an implement in accordance with the invention,

FIG. 2 is a side view, to an enlarged scale, taken in the direction of the arrow II in FIG. 1, FIG. 3 is a scrap view, to an enlarged scale, showing working members of the implement, FIG. 4 is a scrap view of an alternative hood construction, FIG. 5 is a sectional view, taken on the line V—V in FIG. 4, FIG. 6 is a scrap view showing the working members provided with scrapers, FIG. 7 shows a second embodiment of a working member, FIG. 8 is a view taken in the direction of the arrow VIII in FIG. 7, FIG. 9 is a view showing a third embodiment of a working member, FIG. 10 is a view taken in the direction of the arrow X in FIG. 9, FIG. 11 is a view showing a fourth embodiment of a working member, FIG. 12 is a view taken in the direction of the arrow XII in FIG. 11, FIG. 13 is a plan view of a second embodiment of the implement in accordance with the invention, FIG. 14 is a view taken in the direction of the arrow XIV in FIG. 13, FIG. 15 is a side view of a further embodiment of the implement in accordance with the invention, FIG. 16 is a plan view of the further embodiment, FIG. 17 is a scrap view, to an enlarged scale, showing a working member, FIG. 18 is a scrap view, in plan, of an alternative construction of apertured portion of the hood, FIGS. 19 and 20 are scrap views, similar to FIG. 18 of a further alternative construction, and FIG. 21 is a scrap view of a still further construction.

Referring now to FIGS. 1 and 2 of the drawings, the soil cultivating implement comprises a frame having frame beams 1 and 2 which are spaced apart from each other, the frame beam 2 being spaced rearwardly of the frame beam 1 with respect to the intended direction of operative travel A. The laterally outer ends of the beams 1 and 2 are interconnected by curved portions 3 and near the centre of the frame beams 1 and 2, there is arranged a housing 4 which has its forward end secured to the beam 1 and is fastened to the rearmost beam 2 by means of a support 5. The rear end of the housing 4 carries a gearbox 6 in which a rotatable shaft 7 is drivingly received, the shaft 7 extending perpendicularly of the direction A and having a bevel gear mounted on its end which is received within the gearbox 6. The bevel gear (not shown) of the shaft 7 meshes with a bevel gear (not shown) carried by a shaft 8, which is journalled in the housing 4 and is adapted for connection, through an intermediate shaft 9 and universal joints, with the power take-off shaft of a tractor or the like propelling the implement.

A hood 11 forming part of the surface of a cylinder is connected to the rearmost beam 2 by means of supports 10 which extend downwardly and rearwardly from the beam 2. The hood 11 comprises a closed plate-shaped integral portion 12 to which the supports 10 are secured. An apertured portion 13 is connected near the upper edge of the portion 12 and comprises a grating formed of rods 14 which are preferably made of spring steel. The rods 14 extend parallel or substantially parallel to a plane perpendicular to the axis of the shaft 7 and the rods are spaced apart from each other by at least 5 cms. so as to define elongated openings having major axes extending parallel to said plane.

It will be seen in FIG. 2 that the rods 14 extend from near the upper edge of the portion 12 of the hood 11 in a curve which has its rearmost edge located substantially at the same level as the shaft 7. The hood 11 comprises a lower portion 15 which has a bent over lower end member 16 which can engage the ground during operation. An angle beam 16A is secured to the front face of the portion 15 near the upper edge of the portion 15. As seen in FIGS. 1 and 2, trailing arms 17 are secured to the opposite ends of the beam 16A, the arms 17 carrying bearings 18 in which the ends of the shaft 7 are mounted. At small distances inboard of the arms 17, supports 19 are provided which are secured to the angle beam 16A. The forward ends of the supports 19 carry vertical sleeve bearings 20 in which vertical shafts 21 are received. The shafts 21 have lower bent over ends 22 which extend substantially horizontally and afford axles for ground wheels 23 which are mounted thereon.

Near the center of the angle beam 16A there are arranged two forwardly extending strips 23A (FIG. 2) which are spaced laterally apart from each other and have a screwthreaded block 25 pivotally mounted between them by means of a pin 24. The screwthreaded shank of a crank 26 is received in the threaded block 25 and the crank 26 is also taken through a block 27 pivotally mounted between two lugs 29 (FIG. 1) which are secured to the beam 2 and extend forwardly therefrom. The crank 26 can turn within the block 27 but cannot move axially relative thereto. It will be evident that, upon turning of the crank 26, the hood 11 and wheels 23 will be turned about the axis of the shaft 7 thus causing relative upward or downward movement relative to the frame. Hence adjustment of the crank 26 can cause adjustment of working members mounted on the shaft 7 relative to the ground so that the working members can dig to any desired depth.

On either side of the gearbox 6, the driving shaft 7 carries a plurality of discs 31 which are spaced from each other by sleeves 30 (FIG. 3). Each disc carries three equidistantly spaced digging arms 32 on each of its faces and, as seen from FIG. 2, the six arms 32 each extend substantially tangentially of the shaft 7 which has a hexagonal cross-section between its ends. Each digging arm 32 is secured to its corresponding disc 31 by means of bolts 33.

Referring to FIG. 3 it will be seen that each arm 32 comprises a portion 34 which is inclined to the plane of the corresponding disc 31, the portion 34 then merging into a portion 35 which extends parallel to the plane of the disc 31. However, as seen from FIG. 2, each portion 35 is bent over forwardly with respect to the intended direction of rotation B of the working members. Each portion 35 carries a blade 36, each blade 36 having a length greater than $\frac{1}{20}$ of the diameter of the circle which is described by the tips of the blades during rotation of the working members. As seen from FIG. 3, the blades 36 are so secured to the portions 35 that the greater parts of each blade 36 are located to the side of the corresponding arm 32 remote from that side by which the arm 32 is secured to its disc 31. The arms 32 are arranged on the discs 31 in such a way that all the blades 36 located on the same side of a disc 31 are located on helical lines when viewed in the direction of the axis of the shaft 7.

Near the outer ends of the beam 1 there are arranged supports 37 which extend parallel to the direction A and each carries a horizontal pin 38 which is adapted for connection with one of the two lower links 39 of the three point hitch of a tractor 40. Near the center of the beam 2, there is arranged an upstanding strip 41 on the upper side of the beam 2, the strip 41 extending upwardly and forwardly to have its upper end fastened between two laterally spaced strips 42 which are fastened near the center of the beam 1 and extend upwardly therefrom. The upper link 44 of the three point hitch can be connected to the strips 42 by means of a horizontal pin 43.

Referring again to FIG. 2, it will be seen that there is arranged above the apertured portion 13 of the hood 11, a second hood 45 which is secured to the portion 12 of the hood 11 and extends substantially completely over and above the portion 13. End plates 45A are provided for the implement and extend between and downwardly below the hoods 11 and 45.

Referring now to FIGS. 4 and 5, there is shown an alternative arrangement of hoods, but parts corresponding with the preceding embodiment are designated by the same reference numeral. A second apertured portion 46 is arranged between the apertured portion 14 and the hood 45. The portion 46 comprises a grating formed by a plurality of rods 47, which, however, are spaced apart from each other by a smaller distance than the rods 14 of the hood 11 (see FIG. 5), but the openings defined by the rods 47 are also disposed so that their major axes extend perpendicular to the axis of the shaft 7.

Referring now to FIG. 6, there are shown scrapers for the working members. Each arm 32 carrying a blade 36 is provided near its end with a scraper 48 made of a resilient material and it will be apparent that the scrapers 48 move between the rods 14 of the hood 11 during operation.

FIGS. 7 to 12 show further embodiments of working members which can be mounted on the driving shaft 7.

Referring first of all to FIGS. 7 and 8, there is shown one pair of working members 49A which are secured on opposite sides of the shaft 7 and are spaced equidistant from each other by means of bolts 49. Only one pair of working members 49A is shown although it will be evident that a plurality of such members can be mounted on the shaft 7. The working tip 50 of each member 49A converges to a point and each portion 50 is bent over forwardly with respect to the intended direction of rotation of the shaft 7 and working member during operation.

Referring now to FIGS. 9 and 10, the shaft 7 is provided with a plurality of sleeves 51 which are spaced from each other, though only one of such sleeves 51 is shown. Each sleeve 51 carries a cutting member 52 which has an outer end 53 bent over at right angles. The cutting member 52 is provided on its foremost edge, with respect to the intended direction of rotation, with a cutting edge 54. The sleeve 51 also carries a blade 55 located rearwardly of the cutting member 52 and having an end bent forwardly with respect to said direction of rotation.

Referring now to FIGS. 11 and 12, the working member comprises a blade 56 which is secured to the shaft 7 by means of a resilient spring steel coiled element 57. The element 57 is wound helically around the shaft 7 in such a way, that during operation, the coils of the element 57 tend to tighten around the shaft 7. The end 58 of the element 57 and the blade 56 secured to the end 58 by means of bolts 59, are both bent over forwardly with respect to the intended direction of rotation. The working member is mounted on the shaft 7 by means of a sleeve 61 arranged on the shaft 7, the element 57 being secured to the sleeve 61 by means of two bolts 60. When using the working member shown in FIGS. 11 and 12, a plurality of sleeves 61 can be arranged on the shaft 7 at regular intervals.

The operation of the soil cultivating implement will now be described. The implement is coupled with the three point hitch of a tractor or like propelling vehicle and is moved in the direction A. The shaft 8 which is located inside the housing 4 is coupled with the power take-off shaft of the tractor through the intermediate shaft 9 and, via the gear wheel transmission in the gearbox 6, the shaft 7 rotates in the direction of the arrow B. This direction is opposite to that of the tractor wheels and the working members dig the ground or soil and throw fine soil, clods, sods, stones and the like at first forwardly and upwardly, guided by the portion 15 of the hood 11. Lumpy parts, such as roots, sods, stones and the like are thrown against the grating afforded by the rods 14 of the portion 13 and these then drop into the furrow cut or dug by the working members. Fine soil and small lumps can pass between the rods 14, which rods 14 are arcuately disposed and have elongated openings formed between them which subtend an angle of at least 60°.

It will be appreciated that both large and small sods or clods will partly crumble when in contact with the rods 14 which can vibrate during operation and relatively fine soil will be sifted between the rods and will pass upwardly towards the hood 45. Hence fine soil and relatively small lumps will fall to the ground later than the heavier lumps which cannot pass between the rods 14 so that, first of all, the furrow is filled by the large lumps and then a relatively finer layer of soil or small lumps will be deposited on top of the large lumps in the furrow which has been made by the working members. In this way an ideal seed bed can be obtained.

The clods or sods can be crumbled to a further extent by using a second apertured portion, for example the portion 46 of the embodiment of FIG. 4. The vibrating rods 47 of the portion 46 are spaced closer together than the rods 14 of the portion 13 which assists in the crumbling of the clods. By spacing the apertured portion 13 a small distance from the working members, preferably less than 10 cm., this assists in reducing or preventing clogging of the openings between the rods 14. In this respect, the resilience of the rods which are of spring steel is advantageous. The provision of the scrapers 48 in the embodiment of FIG. 6 further reduces the possibility of clogging.

With the working members of the embodiment of FIGS. 9 and 10, it is the blade 55 which throws up the soil and the sods and clods after the cutting member 52 has cut or loosened the ground. The provision of the second hood 45 (FIG. 4) arranged above the apertured portions can suppress the formation and dispersion of clouds of dust which are formed when a dry soil is being worked.

With the working members of FIGS. 11 and 12, the blades 56 which work the ground are resiliently mounted on the shaft 7. It will be evident that, if the blade 56 encounters an obstacle, such as a large stone, the coils of the element 57 will tighten to increase the restoring force exerted by the blade on the obstacle.

Referring now to FIGS. 13 and 14 there is shown an alternative embodiment of soil cultivating implement in which the frame comprises a frame beam 62 extending perpendicularly of the intended direction of operative travel V. On either side of the center of the beam 62 and at equal distances therefrom, there are arranged two horizontal beams 63 which extend forwardly therefrom in the direction V. The forward ends of the beams 63 are connected to a trestle 64 which is adapted for connection with the lower links 65 and 66 of the three point hitch of a tractor. The upper end of the trestle 64 is connected to the frame 62 by means of a strip 67. Each of the beams 63 carries a vertical sleeve bearing 68 in which a corresponding vertical shaft 69A is received. Ground wheels 69 are rotatably mounted on the lower ends of the shaft 69A, which shafts 69A are vertically displaceable within the sleeve bearing 69 and can be fixed in a plurality of axial positions relative thereto.

The frame beam 62 is hollow and a plurality of inclined shafts 70 are rotatably mounted in the frame beam 62 at regular intervals therealong. As will be seen in FIG. 14 the shafts 70 extend downwardly and rearwardly from the beam 62. Each shaft 70 carries four radially extending arms 71 and working members 72 comprising blades are mounted on the ends of the arms 71. The shafts 70 are linked by a suitable transmission (not shown) in the hollow frame beam 62 to a shaft 73 which can be coupled with the power take-off shaft of a tractor through an intermediate shaft 74 and universal joints. The transmission within the beam 62 can conveniently comprise a plurality of shafts within the beam 62 and suitable bevel gears between such shafts and the shafts 70. The arrangement of the transmission is such that, during operation, adjacent working members rotate in relatively opposite direction as shown by the arrows in FIG. 13.

Hoods 75 and 76 are connected to the frame beam 62 and extend respectively downwardly and upwardly therefrom. The connections of the hoods 75 and 76 with the frame beam 62 are strengthened by means of plates 77. The hood 75, which is located slightly forwardly of the beam 62, has a downwardly bent over lower end 78 which carries a member 79 on its lower end which can engage the ground during operation. The hood 76 which lies slightly behind the frame beam 62 carries, near its upper edge, an apertured portion 80 comprising a grating with elongated openings formed by a plurality of spaced resilient rods 81. The distance between adjacent rods 81 is at least 5 cm. As seen in FIG. 14, the hood is arranged in close proximity to the path described by the tips of the members 72 during operation.

During operation the implement is moved in the direction of the arrow V and the power take-off shaft of the tractor or the like towing the implement drives the shafts 70 carrying the blade-shaped working members. As mentioned previously, adjacent working members rotate in relatively opposite directions as shown by the arrows. As in the preceding embodiment, the apertured portion 80 separates fine soil and small clods from the relatively larger clods and the like so that the seed bed referred to above is again obtained.

The height of the frame and hood relative to the ground can be adjusted by axial displacement of the shaft 69A within the sleeve bearing 68. Obviously this will also cause adjustment of the depth to which the working members dig during operation.

Referring now to FIGS. 15 to 17, there is shown a still further embodiment of implement in accordance with the invention. The soil cultivating implement comprises a frame having a circular cross section beam 82 which extends perpendicularly of the intended direction of operative travel A. Generally triangular end plates 83 and 83A are arranged on the opposite ends of the beam 82 and are disposed substantially vertically and extend rearwardly of the beam 82. A shaft 86 is rotatably mounted between the plates 83 and 83A in bearings 84 and 85, the shaft 86 extending perpendicular to the direction A and parallel to the beam 82. Pairs of working members are mounted on the shaft 86 at regular intervals therealong, though only one working member is shown in FIG. 16 for the sake of clarity. Each working member comprises a blade 87 and the working members in each pair are angularly spaced from each other by 180° about the axis of the shaft 86.

From FIGS. 15 and 17, it will be evident that each blade 87 has a curved shape comprising two merging portions of cylindrical surfaces having different radii of curvature. Each blade 87 is mounted on the driving shaft 86 by means of an arm 88 so that the cutting edge 89 of the blade 87 is inclined at an acute angle to a plane perpendicular to the axis of the shaft 86. Also the projection of the edge 89 intersects the axis of the shaft 86 in an acute angle. It will also be seen from FIGS. 15 and 17, that the foremost point of the edge 89 merges into a curved portion having a smaller radius of curvature than a curved portion which merges into the rearmost point of the edge 89. The more curved portion is shorter than the less curved portion which merges into the rearmost point of the edge 89 with respect to the intended direction of travel A. The curvatures of the blade are such that the radii of curvature are located forwardly thereof with respect to the intended direction of rotation B. The pairs of working members comprising blades 87 are arranged on the driving shaft 86 in such relative positions that, when viewed in a direction parallel to the longitudinal axis of the shaft, the blades of successive pairs are located on helical lines.

Approximately near the middle of the plates 83 and 83A, there is arranged an angle beam 90 which extends between the plates 83 and 83A parallel to the frame beam 82. A hood generally indicated by the reference numeral 91 is mounted on the beam 90 and partly surrounds the shaft 86 and working members. The hood 91 extends over and above the shaft 86 throughout the length thereof and comprises two portions, that is, a closed portion 92 and an apertured portion 93 comprising a plurality of spaced rods 94. The portion 92 extends forwardly and downwardly from its connection with the angle beam 90 and the portion 93 extends at first upwardly and rearwardly from the beam 90 and then downwardly.

The forward end of the portion 92 is located at substantially the same level as the rear end of the portion 93. It will be evident from FIG. 15 that said two ends are spaced by a greater distance from the circular path traced out by the outer tips of the blades 87 during operation than the remaining parts of the hood 91. The distance between any part of the hood 91 and said circle is less than 10 cm. and at the center is preferably 1 cm., whereas at the front end it is preferably 4 cm. The distance between the forward end of the portion 92 of the hood 91 and the lowermost point of said circle described by the blades 87 is at least 30 cm. and is preferably about 35 cm.

The portion 93 of the hood 91 comprises a grid or grating formed by a plurality of spring steel rods 94 which are of circular cross section having diameters of about 9 mm. The rods 94 are curved as shown in FIG. 15 and are secured to a strip 95 which is detachably connected to the angle beam 90 by means of wing nuts 96.

The portion 93 of the hood 91 can be replaced by a portion having rods which are spaced apart from each other by different distances from the embodiment of FIGS. 15 to 17, such as shown in FIG. 18 in which the rods are spaced closer to each other. As a further alternative, the portion 93 can comprise rods 94 which are adjustable to vary the spacing between adjacent rods (see FIGS. 19 and 20). The rods 94 are adjustable by means of fixing members 96A which are displaceable in a guide 95A formed in the angle beam 90. It will be evident that displacement of the fixing members 96A will cause variation in the spacing of adjacent rods 94. The spacing of adjacent rods 94 can be varied either by inserting a further portion 93 in which the rods are arranged at different spacings (FIG. 18) or it can be arranged that they are displaceable as in FIGS. 10 and 20 so that the spacing can vary between 2 and 10 cm.

Near the center of the frame beam 82, there is arranged a gear box 98 by means of a support 97, the gear box 98 accommodating co-operating bevel gear wheels (not shown). One of the bevel gears is mounted on a shaft 99 which extends parallel to the direction A and is adapted for connection, through an intermediate shaft and universal joints, with the power take-off shaft of a tractor or the like propelling the implement. The other bevel gear is mounted on a shaft extending perpendicular to the direction A and parallel to the frame beam 82, the shaft being arranged within a tube 100 which extends from the gearbox 98 towards the side plate 83. The tube 100 is secured to the gearbox 98 by means of a support 101 and to the plate 83 by means of a support 102. The shaft within the tube 100 affords a driving connection between the gear box 98 and a transmission (not shown) located within a casing 103 for driving the shaft 86 which carries the working members. The casing 103 is secured to the outer side of the plate 83.

The rearmost side of the casing 103 with respect to the direction A carries two spaced supports 104 which carry a tubular guide 105. The guide 105 receives the screw threaded shank of a crank 106 which cooperates with the screw threaded end of a pipe 107 which is also received within the guide 105 and projects downwardly below same. It will be evident that turning of the crank 106 will effect axial displacement of the pipe 107. The pipe 107 is provided with a fork-shaped member 108 on its lower end, such a member extending substantially horizontally. A ground wheel 110 is rotatably mounted on an axle 109 which is carried by the two limbs of the fork member 108 near the ends thereof. A scraper 111 is provided for the wheel 110 and is secured to the limbs of the fork member 108 by means of supports 112. The pipe 107 is provided with a stop 113 which limits axial movement of the pipe 107 relative to the tubular guide 105 in one direction.

The shaft 86 carries bearings 114 and 114A on its ends located on the outer sides of the casing 93 and plate 83A. Each bearing 114 and 114A carries a corresponding rearwardly extending arm 115 and the rearmost ends of the arms 115 are interconnected by a scraping or grading member 116 which extends perpendicular to the direction A and substantially throughout the length of the shaft 86. The scraping member 116 comprises a substantially S-shaped plate (FIG. 16) and the upper side of the S is located forwardly of the lower side. The bearings 114 and 114A are held onto the shaft 86 by means of closing rings or circlips 117. Also it will be seen from FIGS. 15 and 16 that the plate 83A and the casing 103 are both provided with stops 115A against which the arms 115 of the scraping member 116 can bear so that downward turning movement of the scraping member is limited.

On the upper side of the frame 82, there are provided converging upwardly extending strips 118 which have their upper ends connected to two laterally spaced arms 120 by means of a bolt 119. The arms 120 are located between the upper ends of the strips 118 and the arms are also connected between two upstanding lugs 122, carried on the upper side of the gearbox 88, by means of a bolt 121. On the outer sides of the strips 118, the beam 82 carries supports 123 which each carries a pin 124. Each pin 124 is adapted for connection with a corresponding one of the lower links of the three point hitch of a tractor or the like which can propel the implement. The top ends of the arms 120 are formed with holes 125 which are adapted to receive a pin for attaching the implement to the upper link of the three point hitch of the tractor or the like.

The operation of the implement will now be described. The implement is connected to the three point hitch of a tractor or the like and is moved in the direction of the arrow A. The power take-off shaft of the tractor or the like is coupled with the shaft 99 through an intermediate shaft and universal joints. The drive is taken from the shaft 99 through the gearbox 98 and the shaft within the tube 100 to the transmission within the casing 103 and thence to the driving shaft 86 for the blade-shaped working members. The blades 98 move through the soil in the direction of the arrow B which is the same as the direction of travel A. During movement of the blades 87 through the ground, soil is cut or dug by by the cutting edges and the soil is transferred onto the blades and is then displaced in a direction parallel to the axis of the driving shaft by virtue of the particular curved shape of the blades. In this manner, the soil is thoroughly crumbled into smaller parts. Although in the embodiment shown, all the blades displace soil in the same direction, the blades of consecutive pairs may, of course, be arranged in mirror image manner so that overall displacement of soil is suppressed. Since the forward and rear ends of the hood are located at greater distances from the circular path described by the blades during operation than the portions of the hood located between the ends, the soil can be satisfactorily collected and lifted at the front and the risk of soil particles being carried to the rear and then forward again by the blades is prevented or reduced.

The circular path referred to which is described by the outer tips of the blades has a radius of at least 10 cm. and preferably more than 20 cm.

If the axial displacement of the soil by the blades is to be suppressed, an alternative hood construction may be used such as is shown in FIG. 21. The grid or grating portion comprises rods 126 which are inclined to a plane perpendicular to the axis of the shaft 86. The rods 126 are inclined in an opposite direction to the general plane of the blades 87 so that although the soil is displaced by the blades 87 in a direction parallel to the shaft 86, the rods serve to displace the soil in an opposite direction to cancel out or reduce the effect of the axial displacement by the blades 87.

The soil which has been dug and displaced is guided by the hood and is urged against the resilient rods of the grating portion. Relatively lumpy or solid parts of the soil, such as roots, stones, wood, clods and sods and the like cannot pass between the rods and such material falls into the furrows dug by the blades. Fine soil and relatively small lumps which can pass through the openings between the rods fall to the ground later than the larger material and form a loose layer of fine material on top of this relatively larger material. Also there will be some crumbling effect on the clods and sods and the like by the rods which can vibrate during operation.

Although it is not shown in the figures, the gear box 98 can be provided with means for varying the speed of revolution of the driving shaft 86. In this manner, the thickness of the relatively fine layer of soil covering the larger parts can be varied. The quantity of soil which passes between the rods depends upon the speed of revolution of the driving shaft. The desired speed of revolution furthermore depends upon the state of the ground which is to be worked. The scraping member 116 which is upwardly and downwardly turnable about the axis of the shaft 86 assists in obtaining a smooth uniform seed bed. It will be evident from FIG. 15 that the scraping member 116 is drawn over the surface of the deposited material. The depth to which the working members dig can be controlled by the ground wheel 110 which is upwardly and downwardly displaceable relative to the frame by means of the crank 106.

Depending upon the nature of the ground to be worked and the desired result to be obtained, the grid or grating portions of the hood can be exchanged as described above (FIG. 18), or the distance between the rods may be varied as is described with reference to FIGS. 19 and 20.

What we claim is:

1. A soil cultivating implement having a frame and a rotatably mounted shaft inclined to the normal direction of travel and supported by said frame, earth-working members being mounted on said shaft, said earth-working members being rotatable through the soil towards the front end of said implement in the same direction as the normal direction of travel, a hood supported by said frame to at least partly surround said shaft, said hood including a substantially closed portion in front of said earth-working members, said hood having sieve means located above and in the immediate proximity of the path described by the ends of said earth-working members during rotation thereof, said sieve means being connected to the upper end of said closed portion and extending rearwardly therefrom over the highest point of said path to the rear of said implement whereby soil is displaced upwardly and rearwardly in contact with said sieve means, the larger solid parts of the soil being initially deposited to the rear of said earth-working members and the more finely divided soil passing through said sieve means to be subsequently deposited on top of said larger parts of the soil.

2. An implement as claimed in claim 1, wherein said sieve means has elongated openings, the longitudinal axes of said openings being located in planes substantially at right angles to the longitudinal axis of said shaft.

3. An implement as claimed in claim 1, wherein said sieve means has openings which subtend at an angle of at least 60°.

4. An implement as claimed in claim 1, wherein said shaft extends transverse to the direction of the implement's normal travel and said hood extends in the longitudinal direction of said shaft substantially throughout the length of said shaft on either side thereof, said sieve means extending over at least half the area of said hood.

5. An implement as claimed in claim 1, wherein a second hood is located over and above said sieve means.

6. An implement as claimed in claim 5, wherein further sieve means is positioned between said first-mentioned sieve means and said second hood, the openings of said further sieve means being smaller than those of said first-mentioned sieve means.

7. An implement as claimed in claim 1, wherein said sieve means is comprised of a grating, said grating being comprised of spring steel rods.

8. An implement as claimed in claim 7, wherein said rods define a cylindrical surface and lie in planes perpendicular to a plane containing the axis of said shaft.

9. An implement as claimed in claim 1, wherein the forward part of said hood is provided with an element which bears on the ground in the working position of said implement.

10. An implement as claimed in claim 9, wherein adjusting means is operatively associated with said hood and the position of said hood can be adjusted about said shaft by said adjusting means between a plurality of height settings relative to the ground, a ground wheel being mounted on said implement near each side of said element, the height of the ground wheels, together with said element, being adjustable relative to said earth-working members.

11. An implement as claimed in claim 1, wherein the distance between the extreme tips of said earth-working members and said sieve means is less than 10 centimeters.

12. An implement as claimed in claim 11, wherein said sieve means is comprised of rods and the distance between adjacent rods is at least 5 centimeters.

13. An implement as claimed in claim 1, wherein said sieve means is a grating of rods and said rods are removably mounted on said implement.

14. An implement as claimed in claim 1, wherein said sieve means is a grating of rods and said rods are mounted to be relatively displaceable for varying the spacing between said rods.

15. A soil cultivating implement having a frame and a rotatably mounted shaft inclined to the normal direction of travel and supported by said frame, earth-working members being mounted on said shaft, said earth-working members being rotatable through the soil towards the front end of said implement in the same direction as the normal direction of travel, a hood supported by said frame to at least partly surround said shaft, said hood including a substantially closed portion in front of said earth-working members, said hood having flexibly mounted sieve means located above and in the immediate proximity of the path described by the ends of said earth-working members during rotation thereof, said sieve means being attached at its forward end to the upper end of said closed portion and extending from the highest point of said path to the rear of said implement whereby soil is displaced upwardly and rearwardly in contact with said sieve means, the larger solid parts of the soil being initially deposited to the rear of said earth-working members and the more finely divided soil passing through said sieve means to be subsequently deposited on top of said larger parts of the soil.

16. An implement as claimed in claim 15, wherein said sieve means is a plurality of coextensive rods, said rods being supported at their forward portions and extending freely to the rear of said implement whereby the trailing portions of said rods are flexible during the operation of said implement.

References Cited

UNITED STATES PATENTS

| | | | |
|---|---|---|---|
| 93,494 | 8/1869 | Stevens | 172—122 X |
| 163,061 | 5/1875 | Fenley | 172—123 X |
| 736,279 | 8/1903 | Lorenz | 172—56 X |
| 893,091 | 7/1908 | McLean | 172—123 X |
| 1,600,663 | 9/1926 | Barrowman | 172—112 X |
| 1,676,646 | 7/1928 | Funk | 172—123 X |
| 1,693,895 | 12/1928 | Hall | 172—113 X |
| 2,020,524 | 11/1935 | Smithburn | 172—548 X |
| 2,473,770 | 6/1949 | Seaman | 172—117 X |
| 2,424,459 | 7/1947 | Hettelsater | 172—79 X |

(Other references on following page)

| UNITED STATES PATENTS | | | |
|---|---|---|---|
| 2,582,364 | 12/1952 | Tice | 172—112 X |
| 2,787,943 | 4/1957 | Browning | 172—112 X |

| FOREIGN PATENTS | | |
|---|---|---|
| 618,658 | 2/1949 | Great Britain. |
| 674,769 | 7/1952 | Great Britain. |
| 821,349 | 10/1959 | Great Britain. |
| 953,202 | 3/1964 | Great Britain. |
| 95,045 | 9/1959 | Norway. |

ROBERT E. BAGWILL, Primary Examiner

A. E. KOPECKI, Assistant Examiner

U.S. Cl. X.R.

172—32, 123